W. O. TAYLOR.

MOTOR SUPPORT FOR SEWING MACHINES.

APPLICATION FILED JAN. 13, 1920.

Reissued May 31, 1921. 15,117.

Inventor
William O. Taylor,
By Bates & Macklin,
Attys

UNITED STATES PATENT OFFICE.

WILLIAM O. TAYLOR, OF MONTREAL, QUEBEC, CANADA.

MOTOR-SUPPORT FOR SEWING-MACHINES.

15,117. Specification of Reissued Letters Patent. Reissued May 31, 1921.

Original No. 1,308,456, dated July 1, 1919, Serial No. 262,236, filed November 12, 1918. Application for reissue filed January 13, 1920. Serial No. 351,249.

*To all whom it may concern:*

Be it known that I, WILLIAM O. TAYLOR, a subject of the King of Great Britain, and resident of the city of Montreal, in the Province of Quebec and Dominion of Canada, have invented certain new and useful Improvements in Motor-Supports for Sewing-Machines, of which the following is a full, clear, and exact description.

This invention relates to a supporting device for an electric motor adapted to be attached to a sewing machine whereby the motor may drive the sewing machine. One of the objects is to provide a simple inexpensive bracket adapted for convenient attachment to existing and standard sewing machine heads, by means forming a part of such standard heads, and without the necessity of altering such heads or adding attaching devices thereto, other than that provided by my supporting bracket itself. More specifically it is contemplated to avoid the drilling of any holes or the provision of any extra screws or other holding means than those now forming part of the usual sewing machine head equipment.

Another object is to so construct such a supporting bracket that the motor may be urged by yielding tension toward the sewing machine head to cause a frictional engagement of the driving wheel of the motor with the usual driving wheel or hand wheel of the head, and at the same time arrange such bracket so that it may support the motor on a pivot in such a manner that it may be swung from its operative position to a position substantially beneath the horizontal arm of the head, and within the space inclosed by the usual cover for such head. Thus the motor may be left on its bracket and may merely require for use the moving of the motor to its operative position, and may not require a special construction of cover for the sewing machine head, nor the alteration of existing compartments in the usual drop-head type of sewing machines. My invention is hereinafter more specifically described in connection with the accompanying drawings, which illustrate a convenient embodiment thereof, and the essential characteristics are summarized in the claims.

Figure 1:
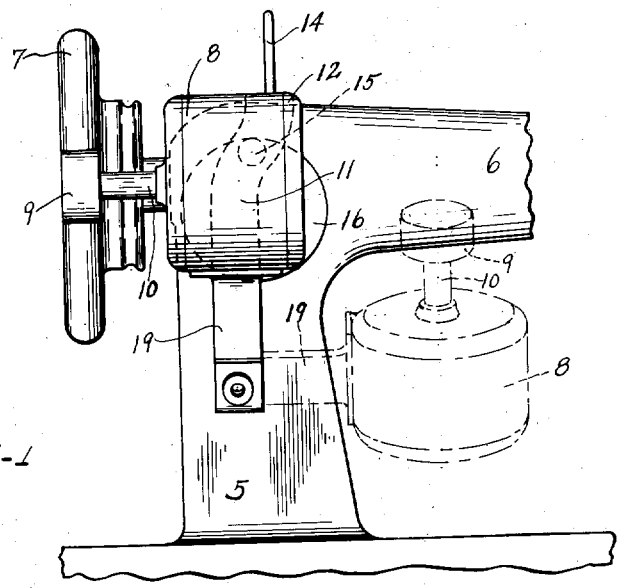
Figure 2:
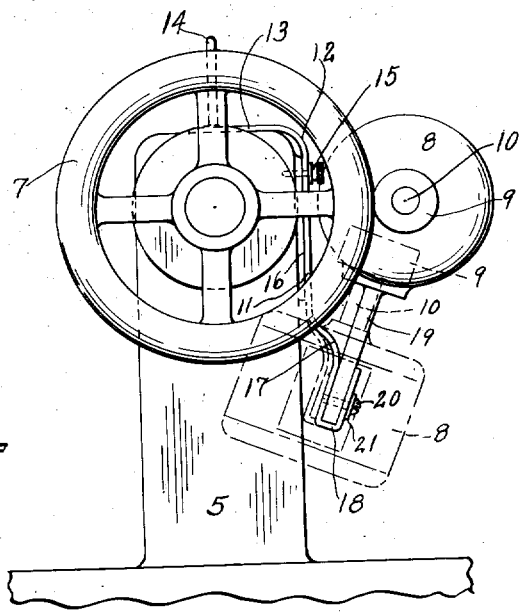

In the drawings, Figure 1 is a side elevation of a sewing machine head, showing my bracket and motor in operative position in solid lines, and illustrating in broken lines an inoperative or idle position of the motor; Fig. 2 is an end elevation of the sewing machine head with the supporting bracket in position, showing, in broken lines, the motor in its idle position.

Referring to the drawings, 5 designates the vertical portion of a standard sewing machine arm, 6 the horizontal member, and 7 the drive wheel of same. In order to drive this wheel 7 by means of a motor and without the use of the usual belt pulley driven from the foot lever, I provide an electric motor 8 having a small friction pulley 9 mounted on the usual armature shaft 10, the pulley 9 frictionally engaging the periphery of the drive wheel 7 when the motor is placed in operative position. To support the motor 8 in position for engagement with the drive wheel 7, I provide a bracket support 11 which comprises a metal strap extending approximately parallel with the vertical arm 5, but bent over at the top 12 and having a horizontal portion 13, adapted to lie across the top of the sewing machine arm where it is held in position upon the spool spindle 14. This horizontal portion 13 is provided with an aperture through which the spool spindle 14 extends to hold the bracket in place. As a further means of holding the bracket 11 in position, I may utilize the set screw 15 which holds the oiling cover 16 in place on the side of the sewing machine head. In this case this set screw 15 passes through the aperture in the vertical portion of the bracket adapted to register with the hole through which the screw 15 passes into its cover plate. By this means, that is by means of the ordinary spool pin 14 and by utilizing the set screw 15, the bracket 11 is held in place without further attaching means.

To cause the motor to be carried inwardly toward the head, urging the friction wheel against the drive wheel of the head, the bracket arm is made of resilient metal, and bent to accomplish this result. I have found it particularly effective to bend the bracket strip outwardly, as at 17, away from the vertical portion of the sewing machine head and secure the motor thereto by a pivotal engagement, urging a supporting post 19, shown as attached to the motor, into close contact with the bracket. This allows the motor to be swung downwardly and inwardly with relation to the sewing machine head, to the position indicated in dot and dash lines in the drawings. This spring bend of the bracket also urges the motor bodily inwardly. The pivot portion of the bracket sloping outwardly and upwardly, as shown, causes the path of the motor, when swung downwardly to a position below the arm, to be such that the motor is in effect carried inwardly, to some extent, beneath the horizontal arm, whereby the usual cover or compartment for the head contains the motor equally well and without requiring enlargement or alterations of such cover or compartment. The spring portion of the bracket moves the motor support member 19 toward the upright portion of the head carrying the motor inwardly bodily as the friction wheel is disengaged from the driving wheel, with the effect that the motor is moved still farther under the arm, as will appear clearly from Fig. 2, by comparing the position of the motor post as indicated by the solid and broken lines.

In the particular arrangement shown, the lower end of the bracket is formed into a U-shaped bend, as at 18, embracing both sides of the motor post. Through this U-shaped bend extends a pivot screw 20, preferably provided with a spring washer 21, to accomplish the desired frictional engagement, securely holding the motor in position, and without interfering with its easy movement from operative to idle position, as described.

It will also be seen that the swinging of the motor does not require disturbing the bracket itself in any way, and the bracket may remain in position and in engagement with the head at all times.

My invention lends itself to various methods of attaching the motor to this flat spring bracket arm, and in commercial practice of the invention, may be very cheaply constructed, and is particularly valuable because it requires no alteration whatever of standard sewing machine heads which are manufactured with great uniformity.

Having thus described my invention, what I claim is:

1. In combination with a sewing machine head having a driving wheel and a spool support at the upper portion thereof, of an electric motor having a friction wheel adapted to engage the drive wheel, and a supporting bracket for said motor comprising a member adapted to extend over the spool support and engage the same, a portion extending downwardly at the side of the sewing machine head, and a member connecting the motor with said downwardly extending portion in such a manner that said portion is normally held away from the sewing machine head by reason of engagement of the friction wheel with the driving wheel.

2. The combination with a sewing machine head having a driving wheel, of an electric motor having a friction wheel adapted to engage the drive wheel, and a supporting bracket for said motor comprising a member extending over the top of the sewing machine head and positioned by the head and having members extending downwardly and upwardly to the motor, said support including a spring adapted to urge the motor toward the head.

3. A motor support, comprising a strip of resilient material, said strip having spaced apertures near one end, said strip being bent so that the portion containing one aperture lies at substantially right angles to the portion containing another aperture, and motor carrying means carried by said strip.

WILLIAM O. TAYLOR.